United States Patent [19]

Harada et al.

[11] Patent Number: 5,272,612
[45] Date of Patent: Dec. 21, 1993

[54] X-RAY POWER SUPPLY UTILIZING A.C. FREQUENCY CONVERSION TO GENERATE A HIGH D.C. VOLTAGE

[75] Inventors: Toyoshige Harada, Takanezawa; Kenichi Tanbo, Ootawara, both of Japan

[73] Assignee: Kabushiki Kaisha Toshiba, Kawasaki, Japan

[21] Appl. No.: 810,112

[22] Filed: Dec. 19, 1991

Related U.S. Application Data

[63] Continuation-in-part of Ser. No. 545,829, Jun. 28, 1990, Pat. No. 5,105,351.

[30] Foreign Application Priority Data

| Jun. 30, 1989 | [JP] | Japan | 1-169645 |
| Jun. 8, 1990 | [JP] | Japan | 2-150458 |
| Dec. 26, 1990 | [JP] | Japan | 2-418372 |

[51] Int. Cl.$^5$ .................................... H02M 5/458
[52] U.S. Cl. .............................. 363/8; 363/26; 363/37; 363/65; 378/101
[58] Field of Search .................. 363/37, 65, 67, 68, 363/71, 8, 159, 163, 24–26, 37, 69, 70, 97; 378/101, 104

[56] References Cited

U.S. PATENT DOCUMENTS

| 4,447,695 | 5/1984 | Inoue | 363/37 |
| 5,040,105 | 8/1991 | Dhyanchand et al. | 363/71 |
| 5,105,351 | 4/1992 | Harada et al. | 363/65 |

*Primary Examiner*—J. L. Sterrett
*Attorney, Agent, or Firm*—Finnegan, Henderson, Farabow, Garrett & Dunner

[57] ABSTRACT

An output voltage of an A.C. power source is input to an frequency converter and the frequency thereof is increased. A plurality of high voltage transformers of small capacity each of which has a secondary winding of a small number of turns and which are connected in parallel with one another are connected to an output terminal of the frequency converter. Outputs of the high voltage transformers are respectively connected to high voltage rectifier circuits. Outputs of the high voltage rectifier circuits are serially coupled, the output voltages thereof are added together, and the addition result is applied to an X-ray tube. Combinations of the high voltage transformers and the high voltage rectifier circuits are molded into units one or a preset number at a time with solid insulating material including gel insulating material.

28 Claims, 14 Drawing Sheets

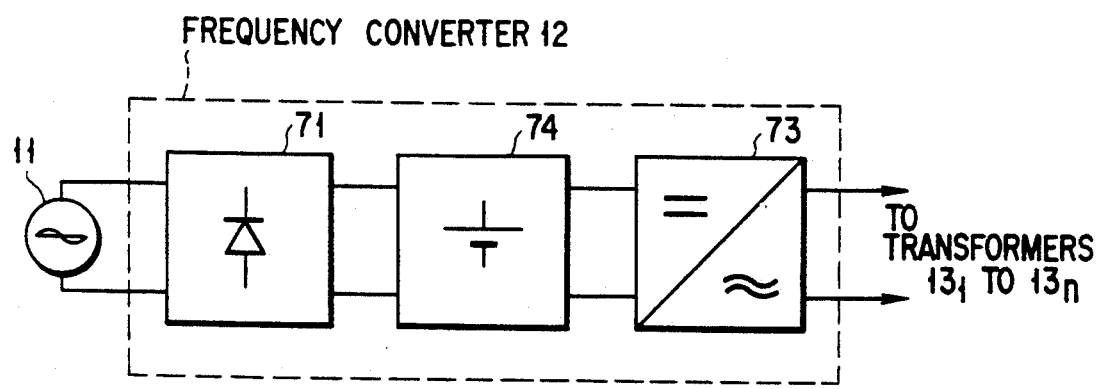
F I G. 6B

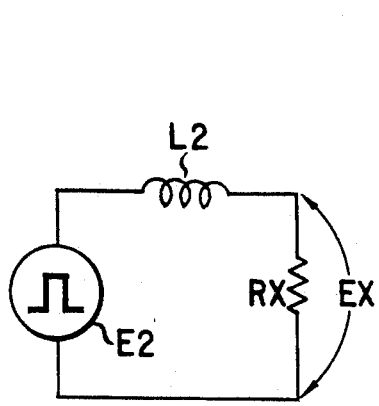
F I G. 7A
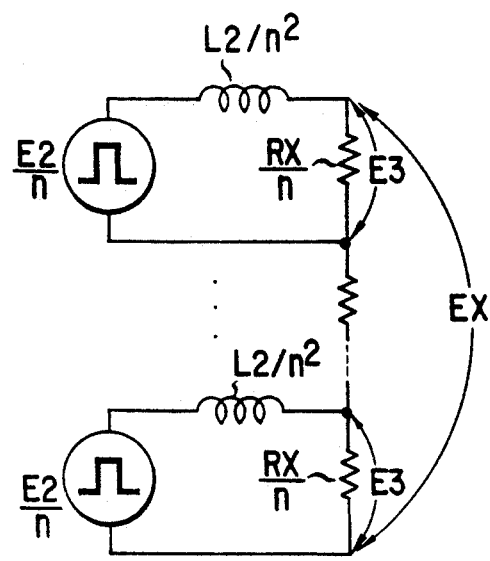
F I G. 7B
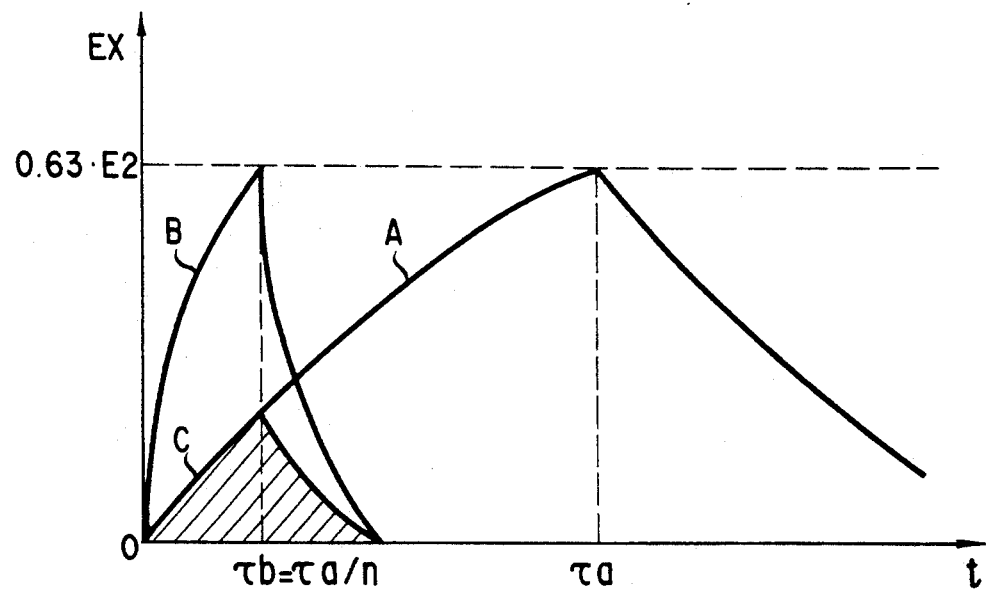
F I G 8

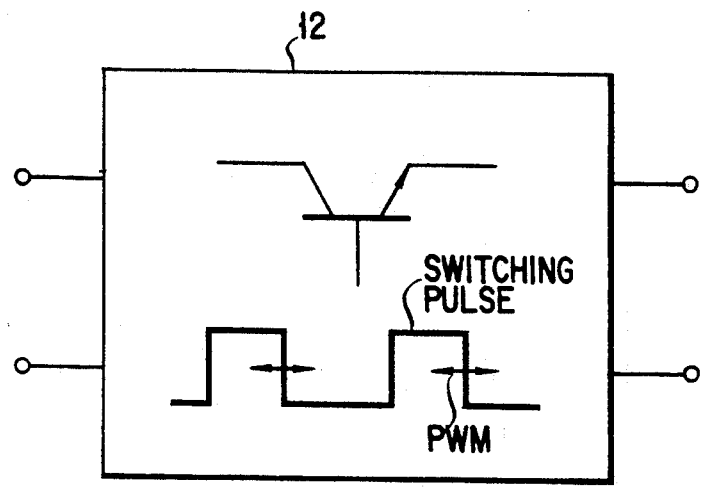
F I G. 9
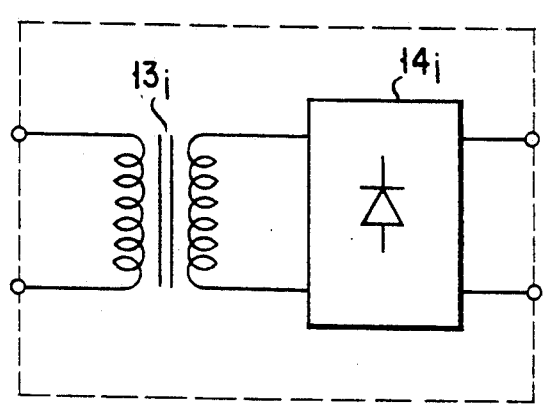
F I G. 10
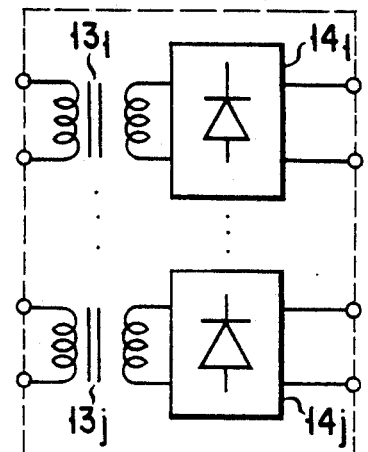
F I G. 11
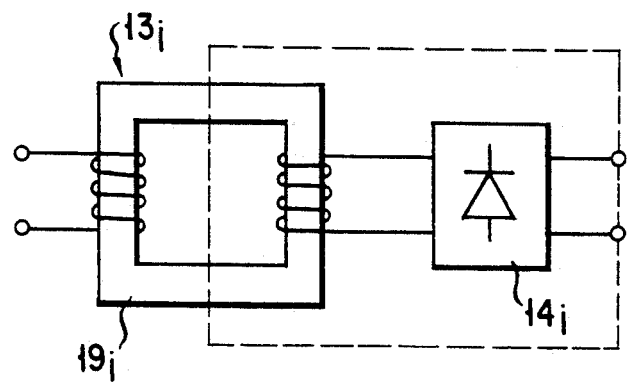
F I G. 12

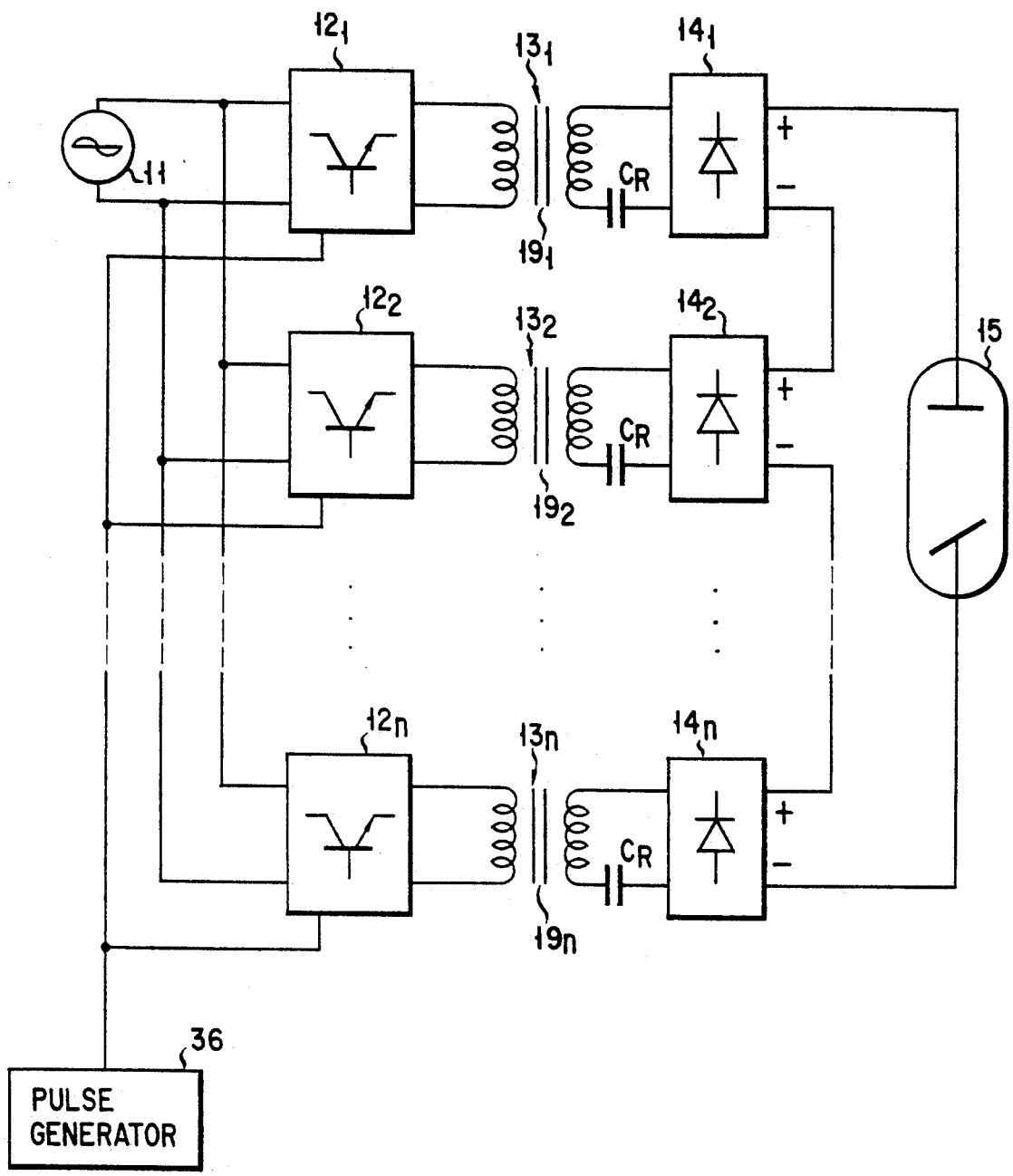
F I G. 13A

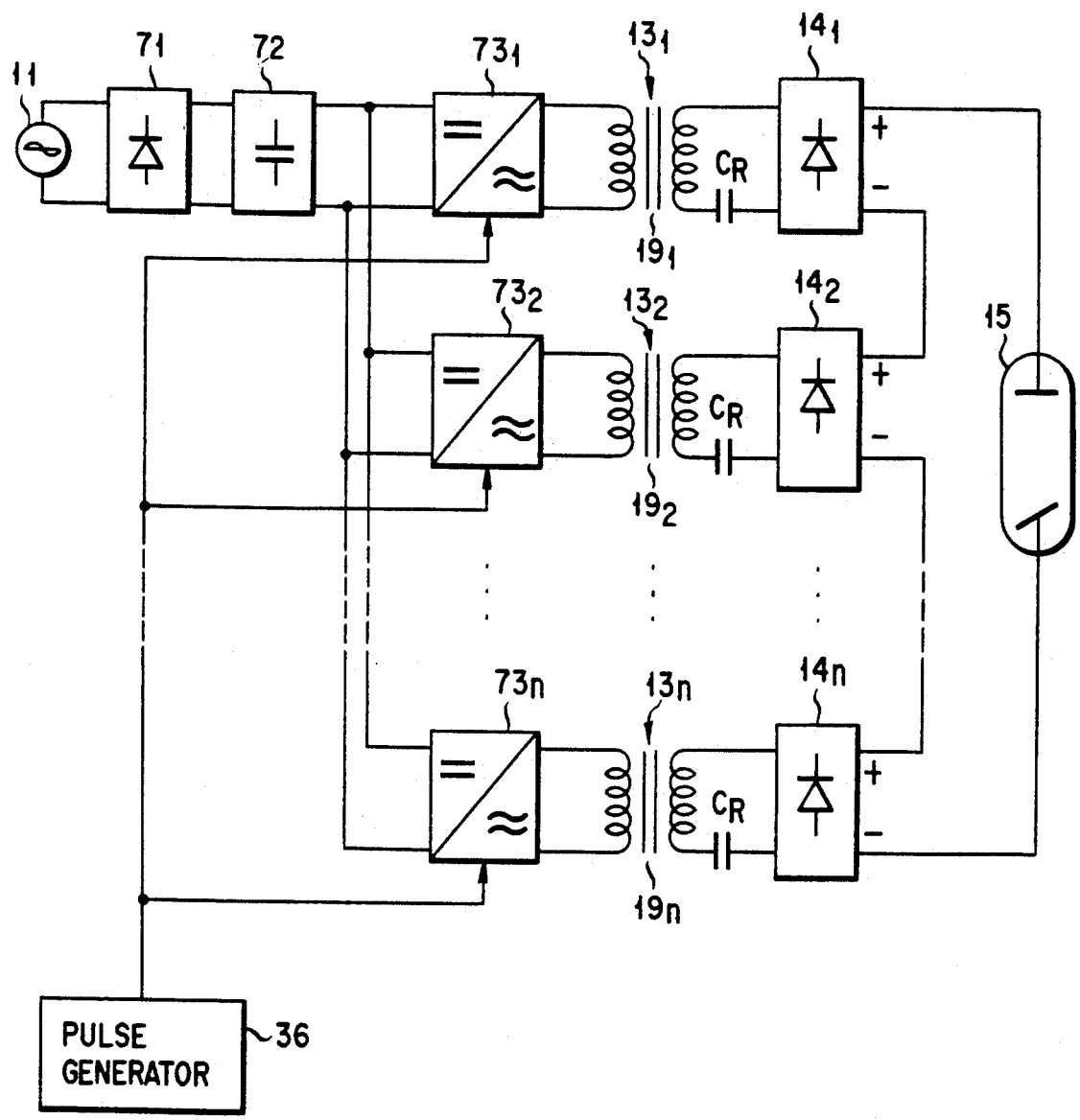
F I G. 13B

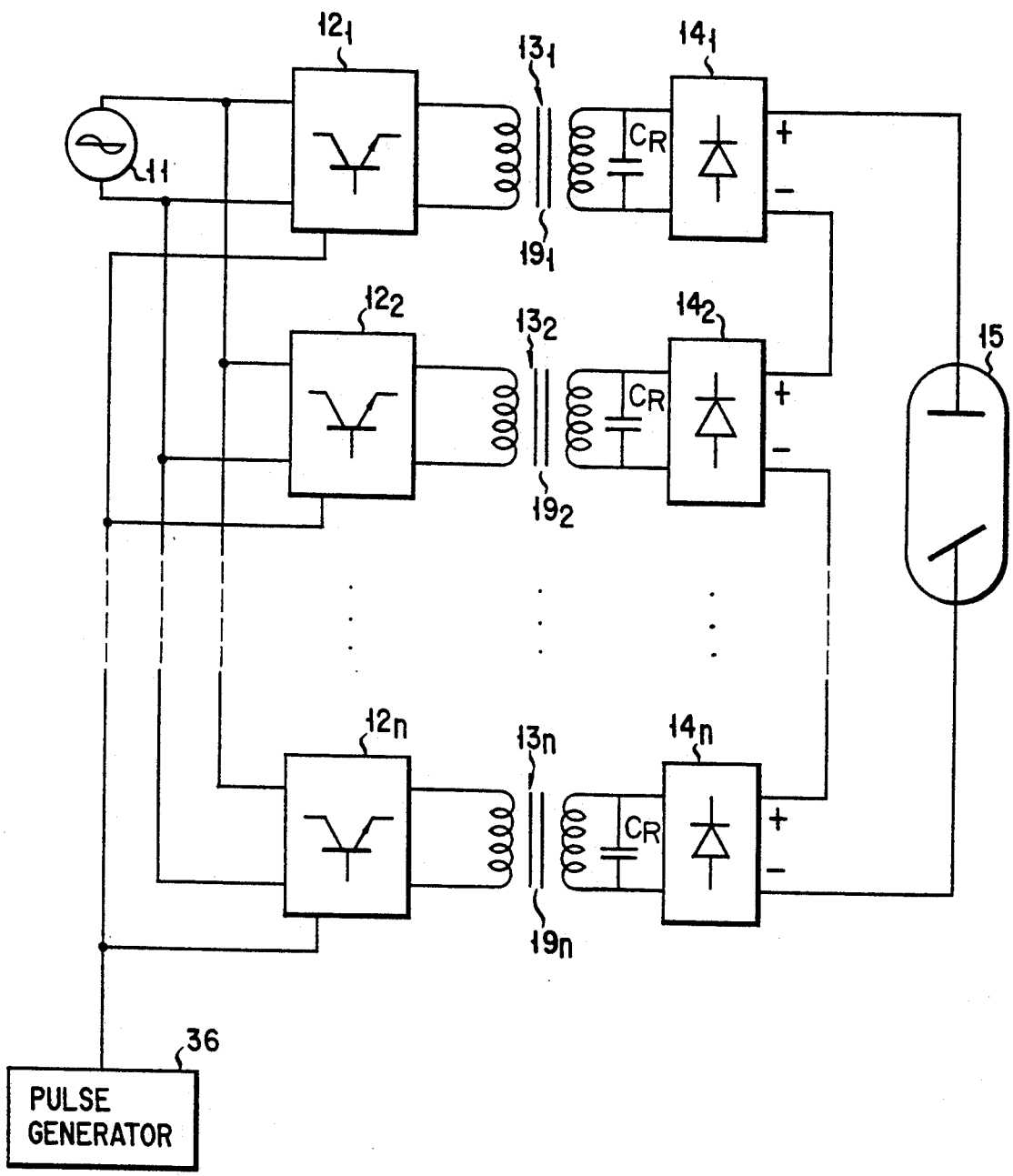
F I G. 13C

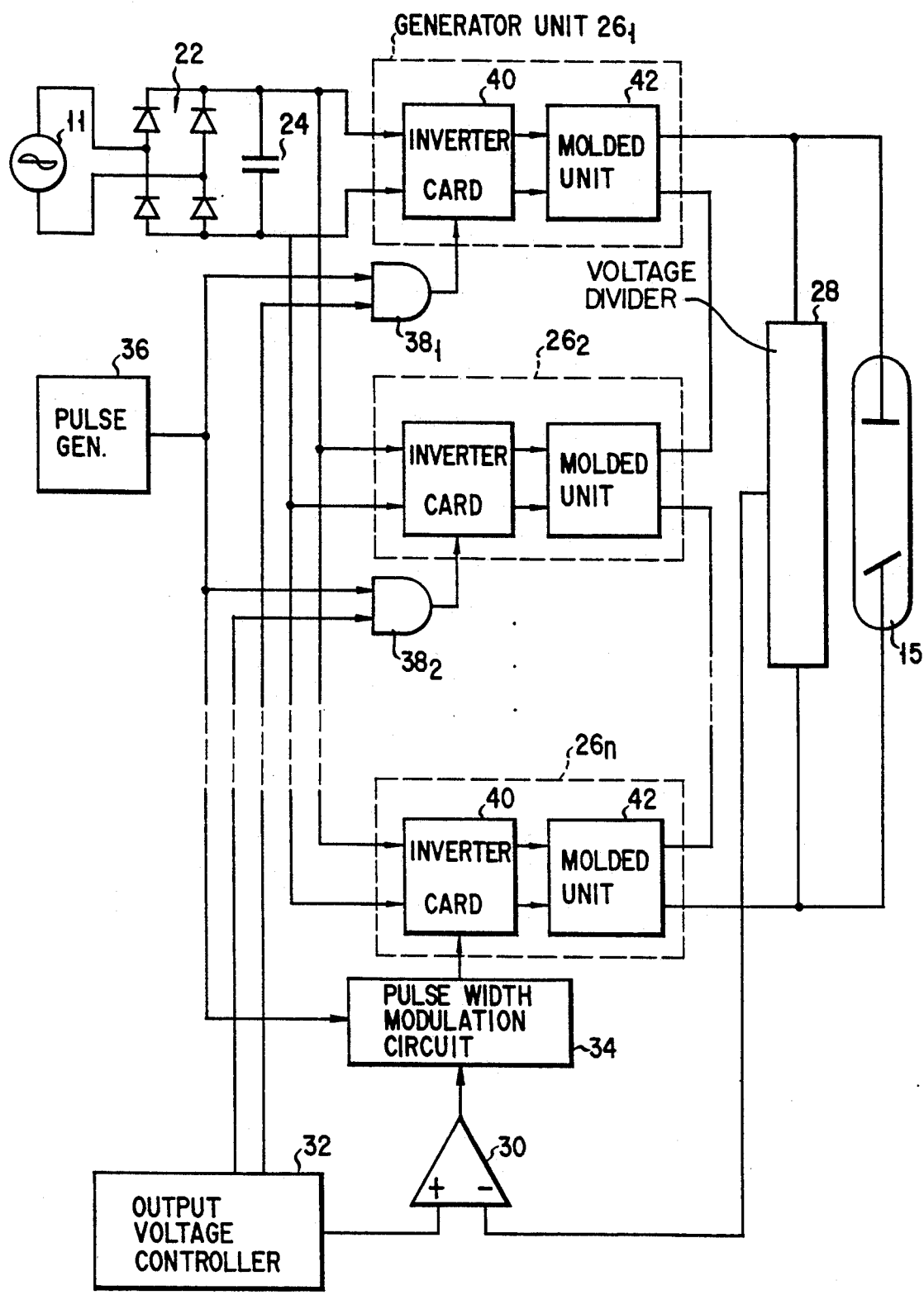
F I G. 16

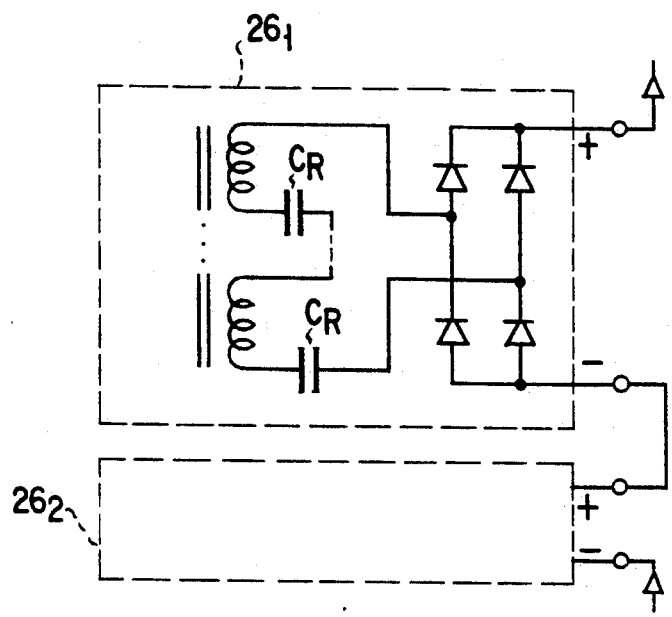
F I G. 19
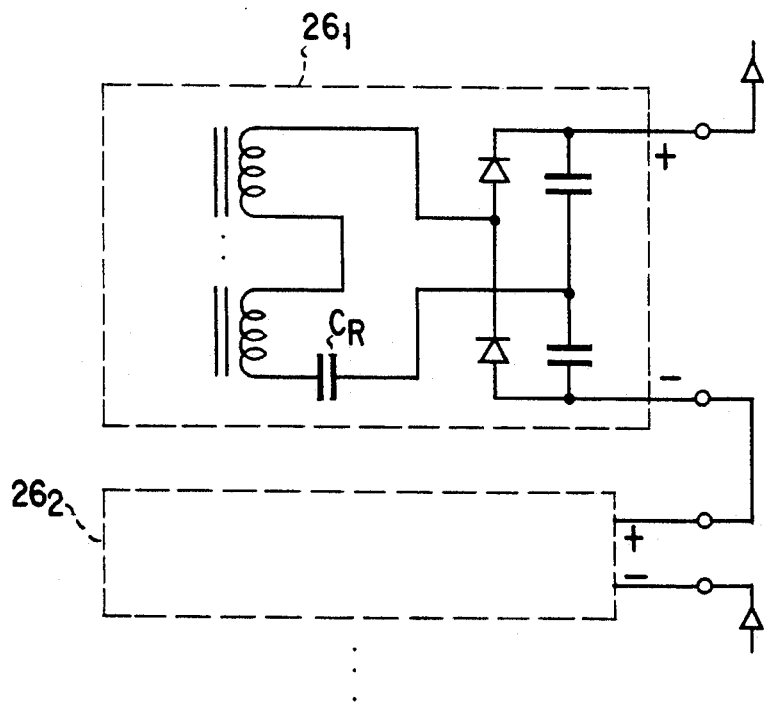
F I G. 20

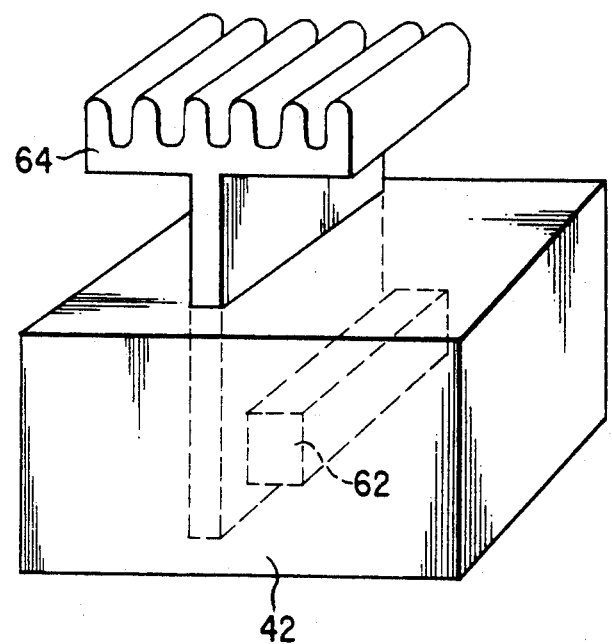
F I G. 21

X-RAY POWER SUPPLY UTILIZING A.C. FREQUENCY CONVERSION TO GENERATE A HIGH D.C. VOLTAGE

CROSS-REFERENCES TO THE RELATED APPLICATIONS

This application is a continuation-in-part of application Ser. No. 07/545,829, filed on Jun. 28, 1990 and allowed on Sep. 27, 1991 U.S. Pat. No. 5,105,351.

BACKGROUND OF THE INVENTION

1. Field of the Invention

The present invention relates to an X-ray generator apparatus having an X-ray tube which generates X-rays when applied with a high voltage obtained by increasing an input voltage to a high A.C. voltage of a high frequency by means of a frequency converter and a high voltage transformer or the like and rectifying the high A.C. voltage.

2. Description of the Related Art

An example of this type of conventional X-ray generator apparatus is shown in FIG. 1. In order to enhance the performance and make the device small and lightweight, a frequency converter 2 for converting the frequency of a voltage supplied from an input power source (A.C. power source) into a high frequency is connected to the primary winding of a high voltage step-up transformer 3. An output voltage of the frequency converter 2 is increased by the high voltage transformer 3 and an output voltage of the high voltage transformer 3 is rectified by a high voltage rectifier 4. A rectified output of the high voltage rectifier 4 is applied between an anode and a cathode of an X-ray tube 5 serving as an X-ray source.

The frequency converter 2 is generally formed of a rectifier for converting the input A.C. voltage into a D.C. voltage, a capacitor for filtering the D.C. voltage, and an inverter for converting the D.C. voltage from the capacitor into an A.C. voltage of a desired frequency. The frequency converter 2 converts the frequency fo (which is a commercial frequency and is generally 50/60 Hz) of the input A.C. voltage to a frequency f1 which is higher than the frequency fo and then applies the voltage to the high voltage transformer 3.

As the output frequency f1 of the frequency converter 2 is set to be higher, the size and weight of the frequency converter 2 and high voltage transformer 3 can be reduced. Since the impedances of coils and capacitors generally vary according to the frequency, the capacitance and inductance can be reduced as the frequency is set higher if the impedances are kept unchanged. Since the capacitance and inductance vary in proportion to the size of the capacitor and coil, the size and weight of the frequency converter 2 and high voltage transformer 3 using the coil and capacitor can be reduced as the frequency becomes higher.

However, in the above X-ray generator apparatus, the output frequency f1 of the frequency converter 2 cannot be increased limitlessly and the upper limit thereof is determined by the characteristic of the high voltage transformer 3 for the following reason.

FIG. 2 shows an equivalent circuit diagram of the device shown in FIG. 1 in view of the secondary winding portion of the transformer 3. In FIG. 2, L1, L2, and M respectively denote the primary inductance, secondary inductance, and mutual inductance of the high voltage transformer 3. N denotes the turn ratio (the number of turns of the secondary windings/the number of turns of the primary windings) of the transformer 3. In this case, in order to obtain a high output voltage, the high voltage transformer 3 is so designed that the number of turns of the secondary winding must be made very larger than that of the primary winding, and as a result, the secondary inductance L2 becomes very larger than the primary inductance L1 and mutual inductance M. Therefore, the inductance of the secondary portion of the high voltage transformer 3 which is actually equal to $(L2-M)$ as shown in FIG. 2 can be regarded as being equal to the secondary inductance L2 by neglecting M. Therefore, in the following explanation, it is assumed that the inductance of the secondary portion is equal to L2. Further, if the equivalent impedance of the X-ray tube 5 is Rx, the terminal voltage of the X-ray tube 5 is Ex, and the rectifier 4 is omitted from being consideration since it does not relate to the terminal voltage Ex, then the secondary inductance L2 is connected in series to the impedance Rx.

If the output frequency of the frequency converter 2 is f1, an impedance Z2 due to the secondary impedance L2 can be expressed by the following equation and it is understood that it varies in proportion to the output frequency f1 of the frequency converter 2:

$$Z2 = 2\pi \cdot P \cdot f1 \cdot L2 \tag{1}$$

Further, the voltage Ex applied to the X-ray tube 5 is expressed as follows:

$$Ex = E2 \cdot Rx/(Rx + Z2) \tag{2}$$

Since the turn ratio N is very large and thus the inductance $(L1-M)/N^2$ can be neglected, the terminal voltage E2 of a mutual inductance M is expressed as follows using the output voltage E1 of the frequency converter 2:

$$E2 = E1 \cdot N \tag{3}$$

As is clearly understood from the equations (1) and (2), the impedance Z2 becomes higher as the output frequency f1 of the frequency converter 2 becomes higher, causing a problem that the voltage Ex applied to the X-ray tube 5 is lowered. For this reason, the output frequency f1 of the conventional frequency converter 2 has an upper limit of several tens of KHz and a higher frequency exceeding this upper limit cannot be attained. If the frequency is set to several tens of KHz, it is difficult to reduce the size and weight of the transformer and rectifier circuit and audio noise may be generated from the transformer 3.

The reason the output frequency f1 of the frequency converter 2 can be increased only to several tens of KHz at most is that the secondary inductance L2 of the high voltage transformer 3 is very large.

In order to solve the above problem, it has been proposed to modify the primary portion of the high voltage transformer 3 as shown in FIGS. 3 and 4. In the circuit of FIG. 3, a capacitor C1 is connected in series to the primary winding of the high voltage transformer 3 to form a series resonance circuit in the primary portion. In the circuit of FIG. 4, a capacitor C2 is connected in parallel with the primary winding of the high voltage transformer 3 to form a parallel resonance circuit in the primary portion. However, in either circuit, a voltage of the primary portion of the high voltage transformer 3 is equivalently increased by the series resonance or parallel resonance circuit. The inductance L1 of the primary portion is originally small and the resonance voltage is low, and therefore, in order to obtain the same voltage applied to the X-ray tube 5 as that obtained in a case wherein no resonance circuit is connected, it is only possible to increase the output frequency of the frequency converter 2 to several times the output frequency set in a case wherein no resonance circuit is connected.

Further, in U.S. Pat. No. 4,545,005 (Mudde), the secondary winding of the high voltage transformer is divided into a plurality of sub-windings to increase the operation frequency of the high voltage transformer. The sub-windings are connected in series through bridge rectifier circuits. The outputs of the rectifier circuits are coupled in series and applied to an X-ray tube. Every other sub-windings have the same sense and the rest have the opposite sense. However, the core of the high voltage transformer is not divided and thus the high voltage transformer can be regarded as being a single transformer. The capacitance of the secondary winding of the transformer can be reduced but the inductance thereof cannot be reduced by a division of the secondary winding. In this USP, an output of one frequency converter is simply connected to a single high voltage transformer. Therefore, like the conventional case shown in FIG. 1, it is only possible to increase the frequency to several tens of KHz at most.

Further, in U.S. Pat. No. 4,317,039 (Romandi), a frequency converter is formed of a main rectifier for three-phase current, a filter member, and a plurality of inverters connected in parallel to the filter member. The outputs of the plural inverters are respectively supplied to a plurality of transformers. The outputs of the plural transformers are respectively supplied to a plurality of rectifiers. The rectified voltages are added together and applied to the X-ray tube. The plural inverters are controlled by a control circuit in such a manner that the phases of the output voltages are chronologically offset relative to one another. The phase displacement amounts expediently to 90°, so that the ripple of the high-voltage at the X-ray tube, as compared with the instance in which only a single inverter and a single transformer are provided, is reduced by a factor of the number of converters used. In this USP, the frequency converter outputs plural different phase voltages to be applied to the plural transformers. If there is any capacitance between an output rectifier and the X-ray tube, the ripple of the output voltage can be made small by increasing the frequency of the output voltage without by displacing the phases of the output voltages. A high-voltage rectifier means of this USP comprises voltage doubler circuits connected to the secondary windings of the transformers. The frequency doubler circuit includes capacitors. Moreover, a high-voltage cable transmitting the high-voltage from the high-voltage rectifier means to the X-ray tube also includes capacitors. The ripple of the output voltage can be smaller by increasing the frequency of the output voltage than displacing the phases of the output voltages. Therefore, this USP in which the phases of the output voltages are displaced in order to make small the ripple does not aim to increase the frequency. This USP describes that the feed frequency of the high voltage transformers, i.e., the frequency of the inverters lies in the medium frequency range and amounts to approximately six to seven KHz.

In this UPS, the number of the inverters must be plural in order to displace the phases of the output voltages.

SUMMARY OF THE INVENTION

An object of the present invention is to provide an X-ray generator apparatus in which a power source voltage is converted into an A.C. voltage of a desired high frequency, the A.C. voltage is increased by a transformer, then the increased voltage is rectified by a rectifier and applied to an X-ray tube, and in which the frequency of the A.C. voltage is increased and the size and weight of the transformer are reduced.

An X-ray generator apparatus according to the present invention comprises frequency converter means connected to an A.C. power source, for increasing the frequency of an A.C. voltage up to a level above 15 KHz; at least four transformer means connected to an output of the frequency converter means, for increasing the output A.C. voltage from the frequency converter means; and rectifier means for converting the output A.C. voltages from the plural transformer means to D.C. voltages, serially adding all of the D.C. voltages, and applying the result of addition of the D.C. voltages to an X-ray tube.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention in which:

FIG. 6B is a block diagram of another example of the frequency converter of the first embodiment;

FIGS. 7A and 7B are equivalent circuit diagrams of a portion from the secondary winding of a high voltage transformer to an X-ray tube in the conventional device of FIG. 1 and the first embodiment;

FIG. 8 is a diagram showing the characteristic of the first embodiment;

FIG. 9 illustrates the pulse width modulation of the frequency converter;

FIG. 10 is a diagram showing a first modification of the first embodiment;

FIG. 11 is a diagram showing a second modification of the first embodiment;

FIG. 12 is a diagram showing a third modification of the first embodiment;

FIG. 13A is a block diagram of a second embodiment of an X-ray generator apparatus according to the present invention;

FIG. 13B is a block diagram of a modification of the second embodiment of an X-ray generator apparatus according to the present invention;

FIG. 13C is a block diagram of a modification of the second embodiment of the x-ray generator apparatus of FIG. 13A.

FIG. 16 is a block diagram of a third embodiment of an X-ray generator apparatus according to the present invention;

FIG. 19 is a diagram showing a first modification of the third embodiment;

FIG. 20 is a diagram showing a second modification of the third embodiment; and

FIG. 21 is a diagram showing a third modification of the third embodiment.

DETAILED DESCRIPTION OF THE PREFERRED EMBODIMENTS

Figure 5:
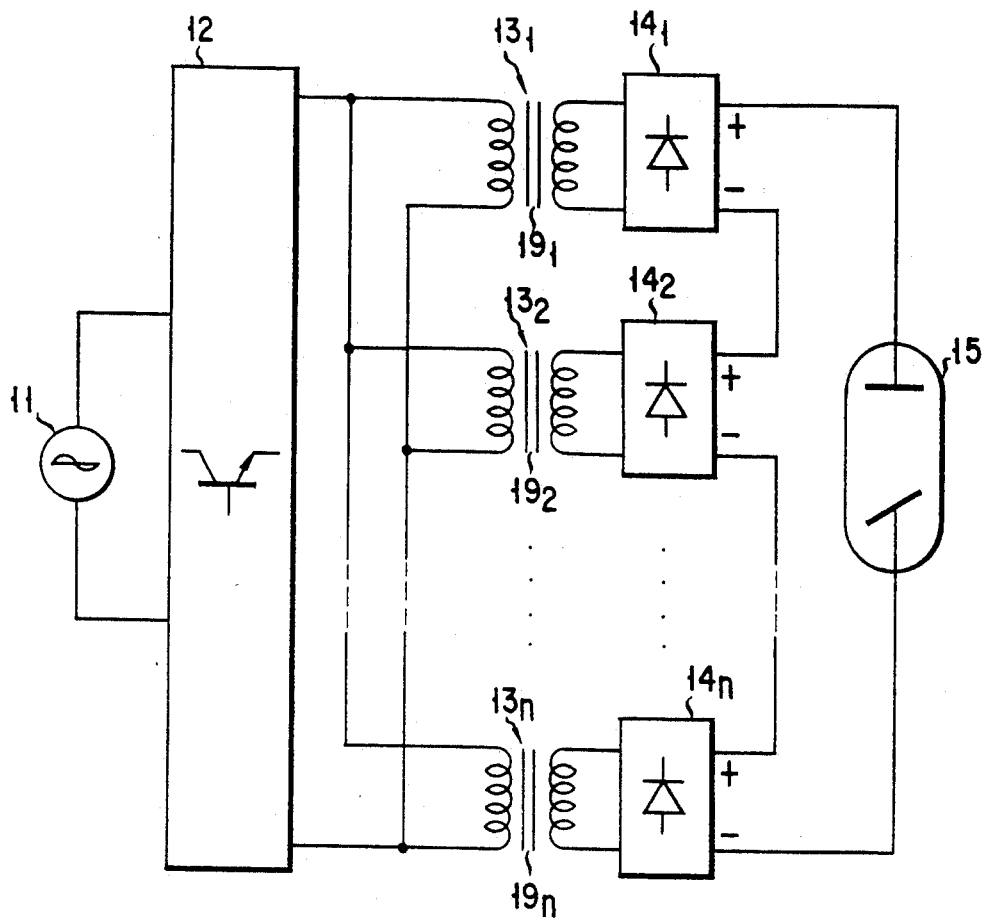
FIG. 5 is a block diagram of a first embodiment of an X-ray generator apparatus according to the present invention.

There will now be described an embodiment of an X-ray generator apparatus according to the present invention with reference to the accompanying drawings. FIG. 5 is a block diagram showing the construction of a first embodiment. An A.C. power source 11 serving as an input power source is connected to the input terminal of a frequency converter 12. The frequency converter 12 increases the frequency of an A.C. voltage supplied from the A.C. power source 11.

Figure 6A:
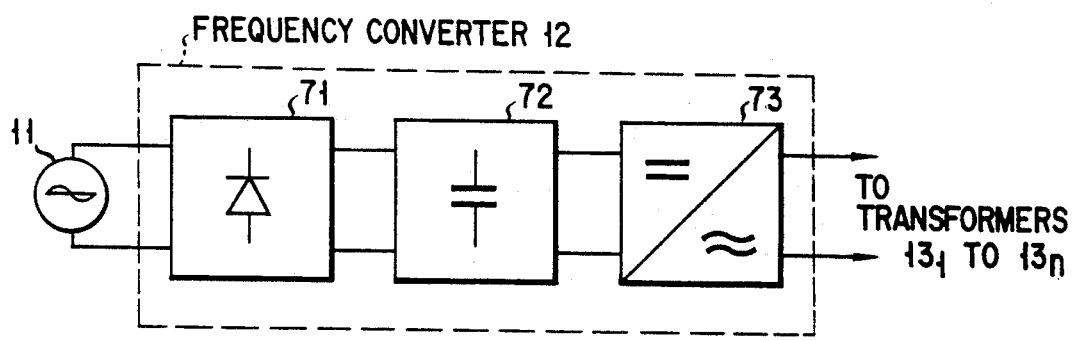
FIG. 6A is a block diagram of one example of a frequency converter of the first embodiment.

The frequency converter 12 is formed of, as shown in FIG. 6A, a rectifier 71 for converting the input A.C. voltage from the A.C. power source 11 into a D.C. voltage, a capacitor circuit 72 for filtering the D.C. voltage from the rectifier 71, and an inverter 73 for converting the D.C. voltage from the capacitor circuit 72 into an A.C. voltage of a desired frequency.

The frequency converter 12 of a mobile type X-ray generator apparatus is formed of, as shown in FIG. 6B, the rectifier 71, a battery circuit 74, and the inverter 73.

High voltage transformers $13_1, 13_2, \ldots 13_n$ are connected in parallel with one another between output terminals of the frequency converter 12. The number of transformers is preferably more than four. If the number of transformers is set to four, a reference (ground) potential is connected between two transformers connected to the anode side of the X-ray tube and two transformers connected to the cathode side of the X-ray tube. In FIG. 5, one end of the primary winding of each of the high voltage transformers $13_1, 13_2, \ldots 13_n$ is connected to one of the output terminals of the frequency converter 12 and the other end of the primary winding of each of the high voltage transformers $13_1, 13_2, \ldots 13_n$ is connected to the other output terminal of the frequency converter 12. It is preferable to form cores $19_1, 19_2, \ldots 19_n$ of the high voltage transformers $13_1, 13_2, \ldots 13_n$ by using ferrite or the like, which has a good frequency characteristic, in order to attain the high operation frequency.

The secondary windings of the high voltage transformers $13_1, 13_2, \ldots 13_n$ are respectively connected to high voltage rectifiers $14_1, 14_2, \ldots 14_n$. The output terminals of the high voltage rectifiers $14_1, 14_2, \ldots 14_n$ are connected in series and the result of serial addition obtained by the series connection is applied to an X-ray tube 15. That is, the positive output terminal of the high voltage rectifier $14_1$ is connected to the anode of the X-ray tube 15, the negative output terminals of the high voltage rectifiers $14_1, 14_2, \ldots 14_{n-1}$ are connected to the positive output terminals of the high voltage rectifiers $14_2, 14_3, \ldots 14_n$, and the negative output terminal of the high voltage rectifier $14_n$ is connected to the cathode of the X-ray tube 15.

Figure 1:
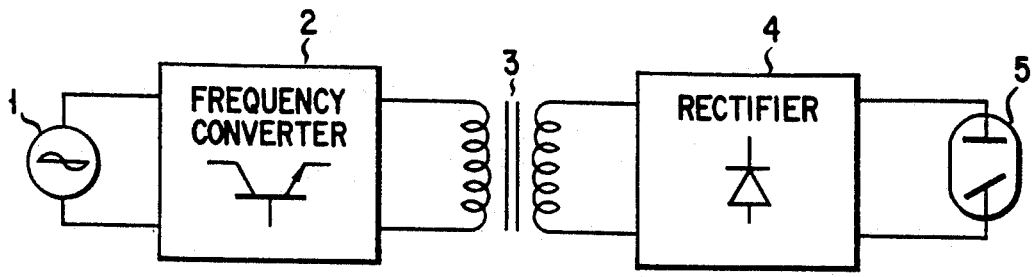
FIG. 1 is a block diagram of an example of the conventional X-ray generator apparatus.
Figure 2:
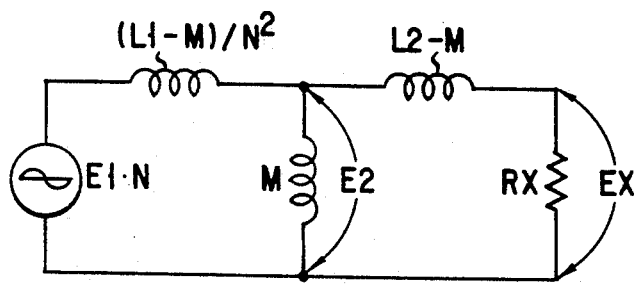
FIG. 2 is an equivalent circuit diagram of the device shown in FIG. 1.
Figure 3:
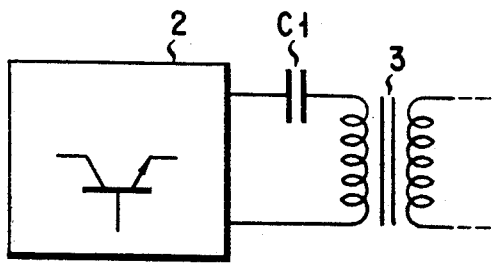
FIG. 3 is a diagram showing another example of the conventional device.
Figure 4:
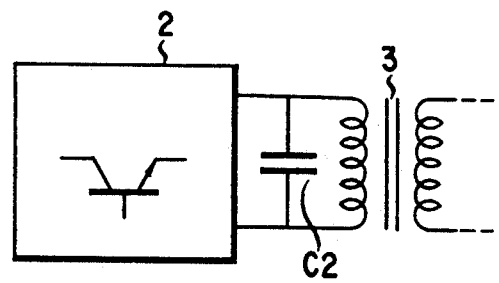
FIG. 4 is a diagram showing still another example of the conventional device.

In this case, the number of turns of each of the primary windings of the high voltage transformers $13_1, 13_2, \ldots 13_n$ is set to be equal to that of the primary winding of the conventional high voltage transformer 3 shown in FIG. 1 and the number of turns of each of the secondary windings of the high voltage transformers $13_1, 13_2, \ldots 13_n$ is set to 1/n (n is the number of the transformers 13) of that of the secondary winding of the conventional high voltage transformer 3 in order to simplify the description.

Next, the operation of the first embodiment is explained. FIG. 7A is an equivalent circuit diagram of a secondary portion (a portion from the secondary winding to the X-ray tube with the rectifier being neglected) of the conventional transformer 3 of FIG. 1. FIG. 7B is the equivalent circuit diagram of the secondary portions of the transformers $13_1, 13_2, \ldots 13_n$ of the first embodiment shown in FIG. 5. In general, the number of turns of the secondary winding of each of the high voltage transformers $3, 13_1, 13_2, \ldots 13_n$ is extremely larger than that of the primary winding thereof, and the secondary inductance L2 is set to a large value. Therefore, the equivalent circuit diagrams can be expressed only by the secondary inductance L2 as shown in FIGS. 7A and 7B. The frequency converter is generally on/off operated by the switching pulse and outputs a pulse signal. Therefore, the output voltage E2 of the transformer is also expressed by a pulse.

If, in FIG. 7A, $L2/Rx = \tau a$, then the voltage Ex applied to the X-ray tube 5 is expressed by using the time constant $\tau a$ as follows and rises as shown by a curve "A" in FIG. 8. The reference time $t = 0$ with respect to time t in FIG. 8 is a timing at which the voltage E2 starts to rise.

$$Ex = E2(1 - e^{-t/\tau a}) \quad (4)$$

That is, if it is assumed that the pulse width of the voltage E2 is $\tau a$, the tube voltage Ex is set to a maximum value $(0.63 \times E2)$ at the time of $t = \tau a$.

On the other hand, in the device of the first embodiment shown in FIG. 5, the number of turns of the secondary winding of each of the high voltage transformers $13_1, 13_2, \ldots 13_n$ is set to 1/n of that of the high voltage transformer 3 in the conventional device shown in FIG. 1. Since the inductance of a coil varies in proportion to the square of the number of turns, the secondary inductance becomes $L2/n^2$ and the secondary voltage becomes E2/n in each of the high voltage transformers $13_1, 13_2, \ldots 13_n$. Further, the load of each of the high voltage transformers $13_1, 13_2, \ldots 13_n$ is substantially the same as a value obtained by dividing the load Rx of the conventional device by n, that is, it becomes Rx/n. As a result, the equivalent circuit diagram of the embodiment of FIG. 5 can be expressed as shown in FIG. 7B.

In secondary portion of each of the high voltage transformers $13_1, 13_2, \ldots 13_n$, the time constant $\tau b$ is expressed as follows according to the above description with reference to FIG. 7A:

$$\begin{aligned} \tau b &= (L2/n^2)/(Rx/n) \\ &= (L2/Rx)/n \\ &= \tau a/n \end{aligned} \quad (5)$$

A voltage E3 applied to the load Rx/n is expressed as follows:

$$E3 = E2\,(1 - e^{-t/\tau b})/n \quad (6)$$

The voltage Ex applied to the X-ray tube 15 is given as follows by serially adding the terminal voltages E3 of the loads:

$$\begin{aligned} Ex &= n \cdot E3 \\ &= E2 \cdot (1 - e^{-t/\tau b}) \end{aligned} \quad (7)$$

That is, as shown by a curve B in FIG. 8, at the time of $t = \tau b$, the tube voltage Ex is set to 0.63.E2 which has been reached at the time of $t = \tau a$ in the conventional device. In this case, since $\tau b = \tau a/n$ as shown in the equation (5), the time constant of the device according to the embodiment shown in FIG. 5 is set to 1/n of that of the conventional device shown in FIG. 1, and therefore, it is understood that the frequency of each of the transformers $13_1, 13_2, \ldots 13_n$ can be increased by "n" times since the same voltage is obtained if the pulse width of the output of the frequency converter 12 is set to $\tau b$.

In the conventional high voltage transformer 3 shown in FIG. 7A, even if the switching pulse width of the frequency converter 2 is simply changed from $\tau a$ to 1/n times ($= \tau b$) to increase the frequency, the peak value of the tube voltage Ex expressed by the equation (4) becomes smaller as shown by a curve C in FIG. 8 and the power applied to the X-ray tube simply becomes small as indicated by a hatched portion.

As described above, according to the first embodiment, the high voltage transformer is divided into a plurality (for example, n) of transformers $13_1, 13_2, \ldots 13_n$ having a small capacity (the number of turns of the primary winding is kept unchanged and the number of turns of the secondary winding is reduced to 1/n times the original value), the primary windings of the divided transformers $13_1, 13_2, \ldots 13_n$ are connected in parallel with one another between the output terminals of the frequency converter 12, and a voltage obtained by serially adding together the results of rectification of the outputs of the respective transformers is applied to the X-ray tube 15. Thus, the secondary inductance of each of the transformers $13_1, 13_2, \ldots 13_n$ can be reduced to $1/n^2$ times the original value, and as a result, the upper limit of the output frequency of the frequency converter 12 is increased by n times. It is possible to make small the sectional area of the core in proportion to the increase of the operation frequency. The high voltage transformers and the frequency converter can be made small when the operation frequency is increased. Therefore, the apparatus including the frequency converter 12 and high voltage transformers $13_1, 13_2 \ldots 13_n$ can be made small and lightweight. Since the output frequency of the frequency converter 12 can be increased up to approximately several hundreds of KHz or to a frequency which exceeds the audio frequency, generation of audio noise which is a problem in the conventional device can be prevented.

Further, since the output control of the frequency converter 12 can be effected at a higher speed as the output frequency thereof increases, a high voltage applied to the X-ray tube 15 can be more precisely controlled by using the feedback control. Further, since ripples of a waveform of the high voltage become smaller as the frequency becomes higher, a flat waveform of the high voltage can be obtained. Further, if an A.C. power source 11 of a three-phase is used, it is possible to obtain a flat waveform of the high voltage due to the high speed feedback of the output voltage even if the capacitor 72 of FIG. 6 is omitted. In addition, the rising characteristic of the tube voltage can be improved as shown by the curve B of FIG. 8, it becomes easy to apply a high voltage in a pulse form to the X-ray tube 15 and generate X-rays only at necessary timings, thereby making it possible to reduce the amount of X-ray radiation to an object.

Further, it is also possible to connect in series the outputs of the high voltage transformers $13_1, 13_2, \ldots 13_n$ instead of connecting the transformers $13_1, 13_2, \ldots 13_n$ to the respective rectifiers $14_1, 14_2, \ldots 14_n$ and rectify the serially added voltages by a single rectifier. In addition, it is possible to connect a resonant capacitor in series or in parallel to the primary winding of each of the high voltage transformers $13_1, 13_2, \ldots 13_n$. The frequency converter can change the amplitude of the output voltage in addition to the output frequency by a pulse width modulation (PWM) for changing the pulse width of the switching pulse. In the frequency converter 12, the input A.C. voltage is converted into a D.C. voltage. The D.C. voltage is on/off controlled by a switching transistor to obtain an A.C. voltage having a frequency different from that of the input A.C. voltage. The amplitude and the frequency of the voltage output from the frequency converter 12 can be changed by controlling the switching pulse of the switching transistor, as shown in FIG. 9.

Next, modifications relating to the improvement of the first embodiment are explained. In the conventional X-ray generator apparatus, the high voltage transformer and high voltage rectifier are disposed in a container filled with insulating oil. Since the container is substantially entirely filled with insulating oil, the volume and weight thereof become very large. In this case, the maintenance therefor is troublesome and there occurs a problem that oil leaks out of the container and stains the surrounding.

However, in the first embodiment, since the transformer is divided into a plurality of transformers of small capacities, the high voltage transformer and high voltage rectifier are disposed in a container of small capacity and can be molded into one unit with solid insulation material including gel insulating material. Mold type insulating material such as epoxy and material such as silicone gel which is solidified but has a physical property between those of the fluid and solid can be given as other examples of the above insulating material. Since silicone gel has a good high frequency characteristic, it can be preferably used as the insulating material for the device constructed to attain a high frequency.

Each molding unit may be constructed by a single transformer $13_i$ and a single rectifier $14_i$ ("i" being 1 to n) as shown in FIG. 10 or by a plurality of transformers $13_1$ to $13_j$ and a plurality of rectifiers $14_1$ to $14_j$ (j being smaller than n) as shown in FIG. 11. Further, as shown in FIG. 12, only the secondary winding of the transformer $13_i$ and the rectifier $14_i$ are molded and it is not always necessary to mold the primary winding of the transformer $13_i$. Although not shown in the drawing, the high voltage transformer and the high voltage rectifier may be separately molded and they are connected to each other by connectors or cables. Thus, various combinations of the molds can be selectively made.

Unlike the conventional device in which a large-sized high voltage transformer and high voltage rectifier are disposed in one container, use of the above molded unit makes it unnecessary to fill insulating oil into an unnecessary space, so that a small and lightweight X-ray generator apparatus can be realized which can be easily assembled by combining the units and in which replacement can be effected for each molded unit to attain easy maintenance. Further, since the dielectric breakdown voltage of solid insulating material is higher than that of insulating oil, a high insulation efficiency can be attained and the size and weight can be easily reduced. The small and lightweight X-ray generator apparatus requires only a small installation space in a hospital or the like and can be easily transported.

Next, a second embodiment is explained. FIG. 13A is a block diagram of the second embodiment. Portions which are the same as those of the first embodiment are denoted by the same reference numerals and the detail description thereof is omitted. In the first embodiment, only one frequency converter 12 is provided, but in the second embodiment, a frequency converter is also divided into "n" number of frequency converters like a transformer. Frequency converters $12_1$, $12_2$, ... $12_n$ which are connected in parallel with one another are connected to the A.C. power source 11. The switching transistors included in the frequency converters $12_1$, $12_2$, ... $12_n$ are controlled by a same phase pulse from a pulse generator 36. Therefore, the frequency converters $12_1$, $12_2$ ... $12_n$ are operated in the same phase.

Outputs of the frequency converters $12_1$, $12_2$, ... $12_n$ are supplied to the rectifiers $14_1$, $14_2$, ... $14_n$ via the high voltage transformers $13_1$, $13_2$, ... $13_n$. Capacitors $C_R$ are respectively connected in series with the secondary windings of the high voltage transformers $13_1$, $13_2$, ... $13_n$ to constitute series resonant circuits on the secondary portion of the transformers.

Also, in this embodiment, the same effect as that of the first embodiment can be obtained. Further, in a case where some of the frequency converters $12_1$, $12_2$, ... $12_n$ are set into the rest or nonoperative state, outputs of those of the high voltage transformers $13_1$, $13_2$, ... $13_n$ which are connected to the remaining frequency converters bypass the high voltage transformers which are connected to the frequency converters set in the rest state and are applied to the X-ray tube 15. Therefore, the tube voltage can be roughly controlled by controlling the number of frequency converters which are set in the rest state. Moreover, if the frequency converters are PWM-controlled by changing the pulse width of the switching pulse output from the pulse generator 36, the tube voltage can be precisely controlled.

Further, according to the second embodiment, since a number of frequency converters having a small capacity are used, even if a part of the frequency converters becomes defective, the defective frequency converters are set into the rest state and other frequency converters which are otherwise set in the rest or nonoperative state can be used instead of the defective frequency converters. Therefore, it becomes possible to prevent the whole X-ray generator apparatus from being set into the inoperative state. The maximum output is lowered by an amount corresponding to the number of defective frequency converters, but it is seldom to use the maximum output and the device can be used without receiving practical interference while the defective frequency converter is being replaced.

The resonance capacitor $C_R$ is connected to the secondary winding of each of the high voltage transformers $13_1$, $13_2$, ... $13_n$ to cause an LC series resonance so as to prevent the voltage applied to the X-ray tube 15 from being lowered and to further increase the frequency of the frequency converters. It is possible to connect another resonance capacitor to the primary winding of the transformer in addition to the secondary winding of the transformer. Due to this additional resonance capacitor, a multi-resonance circuit is provided. The resonance capacitor can be connected in series with (FIG. 13N or in parallel to (FIG. 13C) the winding.

FIG. 13B shows a modification of the second embodiment. Though in the above described second embodiment, a plurality of frequency converters $12_1$, $12_2$, ... $12_n$ are provided, only the inverters $73_1$, $73_2$, ... $73_n$ are provided in this modification. The A.C. voltage from the A.C. power source 11 is supplied to the rectifier 71 and is converted into a D.C. voltage. The D.C. voltage from the rectifier 71 is supplied to the capacitor circuit 72 and is filtered. The output of the capacitor circuit 72 is supplied to the inverters $73_1$, $73_2$, ... $73_n$. The inverters $73_1$, $73_2$, ... $73_n$ are connected in parallel to the capacitor circuit 72. The outputs from the inverters $73_1$, $73_2$, ... $73_n$ are respectively supplied to primary windings of the high voltage transformers $19_1$, $19_2$, ... $19_n$.

Figure 14:
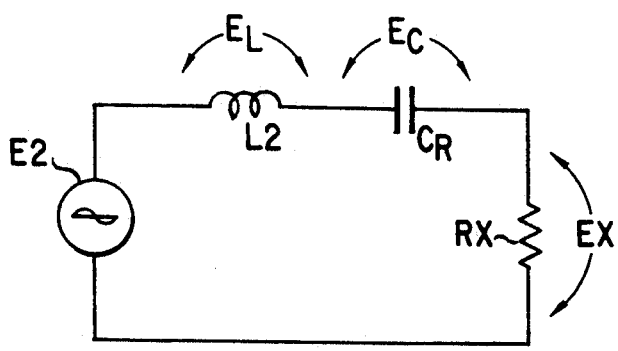
FIG. 14 is an equivalent circuit of a portion from the secondary winding of each of high voltage transformers to an X-ray tube in the second embodiment.

Next, the characteristic of the second embodiment is explained. An equivalent circuit diagram of the secondary portion of one of the high voltage transformers 13 is shown in FIG. 14. Since the frequency converter 12 effects a switching operation based on a switching pulse having a rectangular waveform, the secondary voltage E2 takes a rectangular waveform in the first embodiment as shown in FIG. 7A, but takes substantially a sine waveform in the second embodiment in which the secondary portion is operated in the resonant condition. If the frequency of the sine wave is f and $\omega = 2\pi f$, and if the capacitance of the capacitor $C_R$ is so determined as to set up the condition of $\omega L2 = 1/\omega C_R$ at the frequency f according to the general theory of series resonance, then the impedance of the secondary portion becomes only Rx. Therefore, even if the frequency f is set at a high frequency, influence of the secondary inductance L2 to the tube voltage Ex can be neglected. However, voltages across L2 and $C_R$ in FIG. 14 have inverted phases and cancel each other but $E_L = E2 \cdot \omega L2/Rx$ and $E_c = E2/(\omega C_R \cdot Rx)$ are obtained, and in general, they become relatively larger than E2. Therefore, in the conventional device shown in FIG. 7A, resonance cannot be attained on the secondary portion when the withstanding voltage of the transformer and capacitor and the insulating measure are considered.

However, in the second embodiment, since the high voltage transformer is divided into "n" number of small transformers and capacitors $C_R$ are respectively connected to the secondary windings of the transformers, E2 and L2 in the respective resonant circuits can be reduced to $E2/n$ and $L2/n^2$ as shown in FIG. 7B as in the first embodiment. In particular, L2 decreases inversely with the square of the dividing number "n", it becomes extremely small. In this way, since the voltages $E_L$ and $E_C$ across L2 and $C_R$ can be suppressed to small values, the advantage of the resonance on the secondary portion of the transformer can be effectively used.

As described above, in a case where only the high voltage transformer is divided into small transformers as in the first embodiment, the secondary inductance L2 becomes smaller, making it possible to attain a high frequency operation. However, in a case where the resonance circuit is formed on the secondary portion of the transformer as in the second embodiment, influence by the secondary inductance L2 can be almost neglected, making it possible to attain a higher frequency operation. Alternatively, in a case where the device is operated at the same frequency as that obtained where no resonance circuit is formed on the secondary portion, the dividing number can be reduced within the permissible range of the withstanding voltage of the transformer and the capacitor. Since the primary voltage becomes a sine wave due to the resonance circuit in the secondary portion, it is possible to turn on or turn off switching transistors in the frequency converters at the time of the current does not flow therethrough. Therefore, the heat radiation of the apparatus can be suppressed, thereby increasing the efficiency of the apparatus. The secondary resonance is not limited to the series resonance described above but may be a parallel resonance attained by connecting a capacitor in parallel with the secondary winding of the high voltage transformer.

Figure 15:
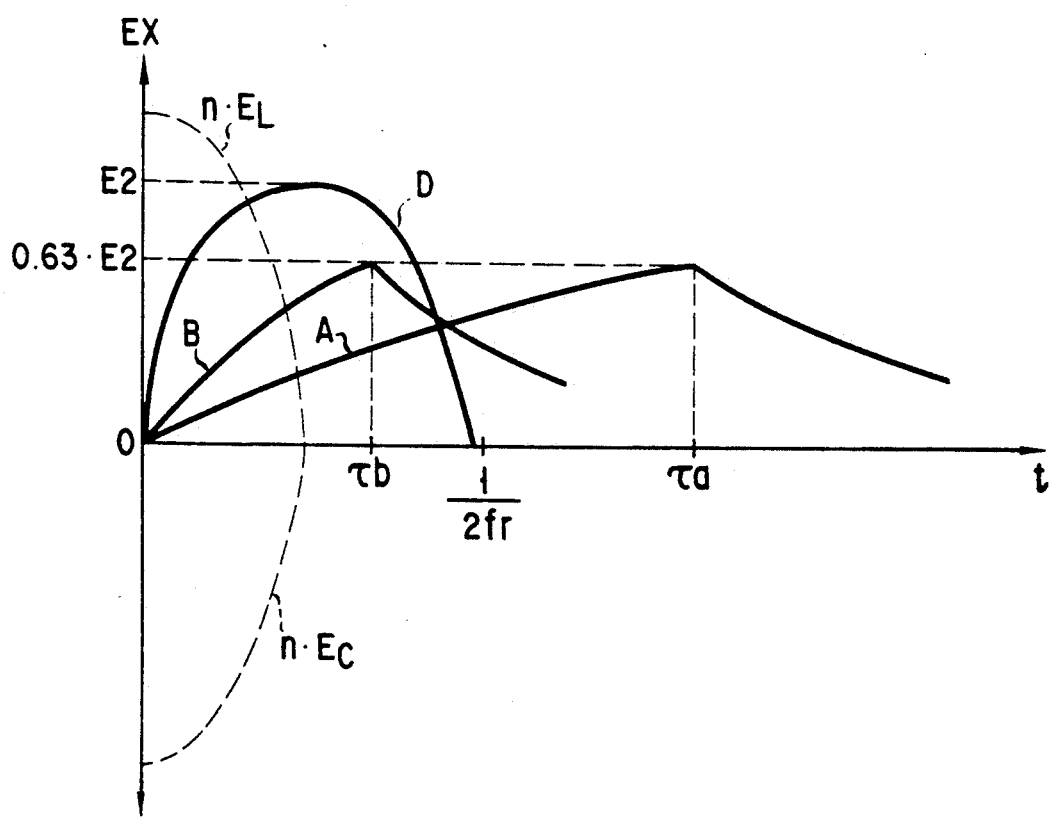
FIG. 15 is a diagram showing the characteristic of the second embodiment.

FIG. 15 shows the characteristic of the voltage applied to the X-ray tube 15 obtained when the secondary portion is set in the resonant mode. In FIG. 15, solid lines indicate Ex, and curves A and B among them respectively indicate the case of the conventional device and the case wherein the transformer is divided into "n" small transformers like the curves A and B of FIG. 8, and a curve D indicates a characteristic obtained when the high voltage transformer is divided into "n" small transformers as in the second embodiment and the secondary portion thereof is set in the resonant state.

According to the second embodiment, the raising characteristic of the curves A and B which is suppressed by the secondary inductance of the transformer is improved by means of the resonance as indicated by the curve D. Therefore, a higher frequency operation can be attained, and the voltage applied to the X-ray tube can be further increased. In FIG. 15, fr indicates the resonant frequency. Further, broken line curves indicate the voltages obtained by multiplying the terminal voltages $E_L$ and $E_C$ of the secondary inductance L2 and the capacitor $C_R$ with the dividing number "n".

As described above, the operation frequency can be further enhanced and the dividing number can be reduced by means of the secondary resonance in comparison with a case wherein only the high voltage transformer is divided into small transformers.

Further, the modifications explained with reference to the first embodiment can also be applied in the second embodiment, and like the first embodiment, the transformers and rectifiers can be selectively molded into respective units with solid insulation material. It is not necessary to respectively connect the transformers to the frequency converters. It is possible to connect several transformers to a single frequency converter.

A third embodiment will now be described with reference to FIG. 16 showing the construction thereof in a block diagram. An A.C. power from the A.C. power source 11 is converted into a D.C. power by a rectifier 22 and a capacitor 24. The D.C. power is applied to plural generator units $26_1, 26_2, \ldots 26_n$. Each of the generator units $26_1, 26_2, \ldots 26_n$ outputs a high voltage which corresponds to the output of each of the high voltage rectifiers $14_1, 14_2, \ldots 14_n$ in the above embodiments. All the outputs from the generator units $26_1, 26_2, \ldots 26_n$ are added together in series and the result of addition is applied to the X-ray tube 15.

Each of the generator units $26_1, 26_2, \ldots 26_n$ includes a frequency converter card 40 and a molded unit 42. The frequency converter card 40 includes a frequency converter for converting the input D.C. voltage into an A.C. voltage of a high frequency. The molded unit 42 includes a high voltage transformer, at least a secondary portion thereof, and a rectifier circuit. In order to control a switching operation of the frequency converter, a pulse generator 36 generating a pulse with a fixed pulse width and a pulse width modulation circuit 34 are provided. The output of the pulse width generator 36 is supplied to most of the generator units 26, e.g., generator units $26_1$ to $26_{n-1}$ via AND gates $38_1$ to $38_{n-1}$ and to the pulse width modulation circuit 34. The output of the pulse width modulation circuit 34 is supplied to the other generator units 26, i.e., to the generator unit $26_n$. The on/off of the AND gates $38_1$ to $38_{n-1}$ are controlled by control signals from an output voltage controller 32, based on a set value of the output voltage.

The applied voltage of the X-ray tube 15 is detected by a high voltage divider 28 which is connected in parallel to the X-ray tube 15. The detected voltage is supplied to one input terminal of a differential amplifier 30. The other input terminal of the differential amplifier 30 is supplied with the set value of the output voltage from the output voltage controller 32. The difference between both the inputs is supplied to the pulse width modulation circuit 34. The pulse width modulation circuit 34 varies the pulse width of the switching pulse output from the pulse generator 36 in accordance with the difference from amplifier 30. Thus, the generator unit $26_n$ is pulse-width-modulated by a voltage feedback method. The switching frequency of the other generator units $26_1$ to $26_{n-1}$ are set to a fixed frequency. Therefore, in order to vary the output voltage applied to the X-ray tube 15, some of the AND gates are turned on by the output voltage controller 32, the number of which corresponds to the output voltage, and the number of the operating generator units is controlled. Thus, the output voltage is roughly controlled. Then, the output voltage is finely controlled by a feedback loop including the pulse width modulation circuit 34.

Figure 17:
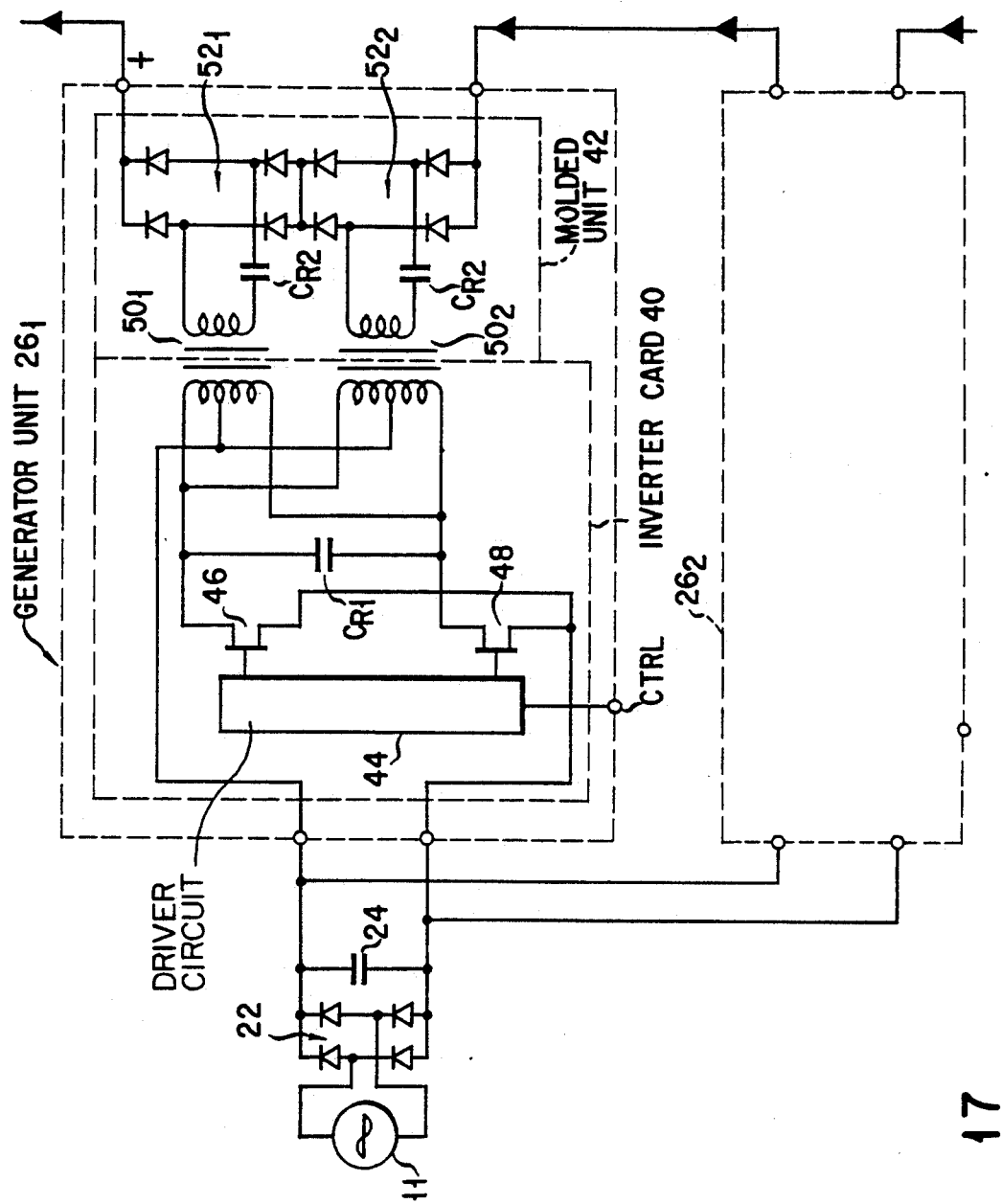
FIG. 17 is a block diagram showing details of a generator unit of the third embodiment.
Figure 18:
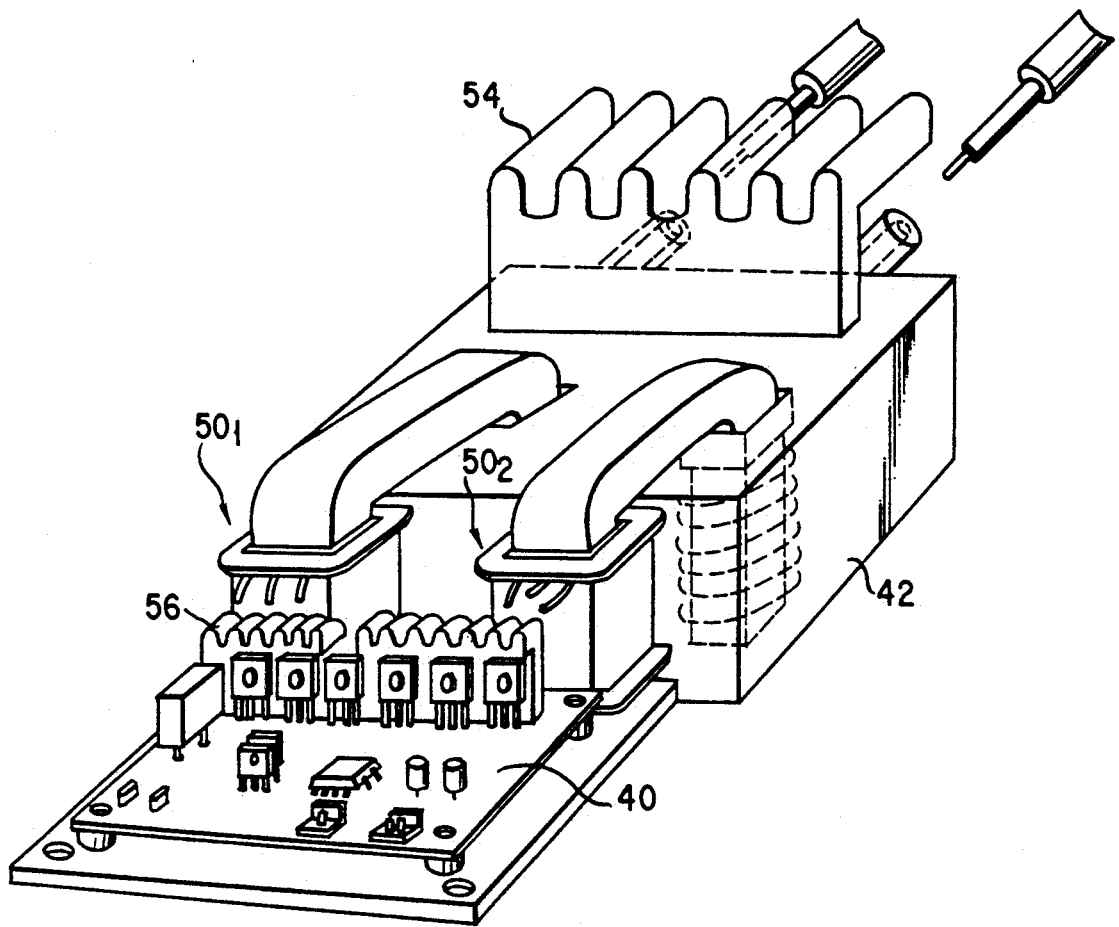
FIG. 18 shows an outer appearance of the generator unit.

Description will be given to the details of the generator unit 26. FIG. 17 is a detailed block diagram of the generator unit 26 and FIG. 18 shows an outer appearance thereof. As shown in FIG. 17, each generator unit 26 includes the frequency converter card 40 which is formed of two switching transistors 46 and 48, and a driver circuit 44 thereof and converts the D.C. input voltage from the rectifier circuit 22 into an A.C. voltage. The frequency converter card 40 is formed on a printed circuit board. An MOSFET is generally used as the switching transistors 46 and 48. However, it is possible to use another element, such as an IGBT, a bipolar transistor, and a thyristor as the switching transistors 46 and 48.

The output from the frequency converter card 40 is supplied to primary windings of plural, in this case, two high voltage transformers $50_1$ and $50_2$. The secondary windings of the high voltage transformers $50_1$ and $50_2$ are respectively connected to rectifier circuits $52_1$ and $52_2$. The rectifier circuits $52_1$ and $52_2$ are connected in series in order to produce a D.C. voltage corresponding to a sum of the outputs from the high voltage transformers $50_1$ and $50_2$.

In the primary circuit of the high voltage transformers $50_1$ and $50_2$, a resonance capacitor $C_{R1}$ is connected in parallel to the primary windings to form a parallel resonance circuit. In the secondary circuit of the high voltage transformers $50_1$ and $50_2$, resonance capacitors $C_{R2}$ are connected in series to the secondary windings to form a series resonance circuit. The efficiency of the frequency converter card 40 can be more improved because of the multi-resonance circuit formed of the primary resonance circuit and the secondary resonance circuit. It is possible to form the multi-resonance circuit by using the serial resonance circuit in the primary circuit and the parallel resonance circuit in the secondary circuit or by using the same type of the resonance circuit both in the primary circuit and the secondary circuit.

As shown in FIG. 18, the primary circuit of the high voltage transformers $50_1$ and $50_2$ is outside the molded unit 42 and the secondary circuits of the high voltage transformers $50_1$ and $50_2$ and the rectifier circuits $52_1$ and $52_2$ are inside the molded unit 42. The molded unit 42 is formed of a container of a transparent polycarbonate and a molding material of a transparent silicone, as in the above embodiments. The other solid insulating material, such as epoxy may be used as the molding material. The molded unit 42 is provided with a radiator 54 formed of a high thermal conductivity such as ceramics to efficiently radiate the heat generated from the rectifier circuits $52_1$ and $52_2$. The frequency converter card 40 is also provided with a radiator 56 for radiating the heat generated from the switching elements and the other.

According to the third embodiment, the frequency converter for converting the input D.C. voltage into an A.C. output voltage is divided into plural converters of a small capacity, and high voltage transformers of a small capacity are connected to each of the plural converters to make a high voltage generator unit. Therefore, the frequency of the A.C. voltage can be extremely increased so that the X-ray generator apparatus becomes small and lightweight. Further, each of the high voltage generator units is molded with the solid insulating material. Therefore, the X-ray generator apparatus can be easily assembled by combining the units and easily maintained by replacing each inoperable molded unit with a new one. Since the resonance capacitor is connected to the high voltage transformer and the frequency converter is operated in a resonance frequency, the efficiency of the frequency converter can be highly increased. The decrease of the efficiency in the fine control of the output voltage can be minimized by controlling the frequencies of only one or more frequency converters in a feedback method.

Modifications of the third embodiment are explained. Though the rectified voltages from the high voltage generators are serially added in the third embodiment shown in FIG. 17, the connection of the rectifying circuits cannot be limited to this example. It is possible to first add the secondary voltages (including terminal voltages of the resonance capacitors $C_{R2}$) of all the high voltage transformers and then rectify the result of addition. It is also possible to first add the secondary voltages of some of the high voltage transformers, then rectify the result of addition, and finally add the result of rectifying, as shown in FIG. 19.

In FIG. 19, resonance capacitors $C_R$ are respectively connected to the high voltage transformers. However, the type of the resonance circuit is not limited to this circuit. It is possible to connect the secondary windings of the high voltage transformers in series to add the output voltages of the transformers and connect a single resonance capacitor to the series connection of the secondary windings to rectify the output voltage, as shown in FIG. 20. The rectifier circuit can be implemented by both of the full-wave rectifier as shown in FIG. 19 and of the multiplier type rectifier as shown in FIG. 20.

The radiator 64 can be shaped as shown in FIG. 21. According to this shape, the efficiency of radiation is improved since the bottom of the radiator 64 is embedded in the molded unit 42 to be contacted to a rectifier circuit portion 62 which is a source of heat.

Moreover, the modifications explained with reference to the first and second embodiments can also be applied in the third embodiment.

As described above, according to the X-ray generator apparatus of the present invention, the output frequency of the frequency converter can be increased by dividing the transformer for increasing an output A.C. voltage of the frequency converter which increases the frequency of an A.C. voltage into a plurality of transformers of small capacity in which the number of turns of the secondary winding is smaller than that of the original transformer, adding outputs of the transformers together, and applying the result of addition to the X-ray tube. As a result, the apparatus can be made small and lightweight, the control speed of the voltage can be enhanced if the frequency is increased, and the output voltage can be precisely controlled by a feedback method. Further, the assembling and maintenance can be simplified by molding the divided transformers and the rectifiers into respective units with solid insulating material (including gel insulating material). In addition, ripple components included in the output voltage can be easily suppressed and stabilized by the high frequency operation and the X-rays can be easily generated in a pulse form. When the frequency is increased, the frequency of the switching pulse of the frequency converter can be set to be higher than the audio frequency so that audio noise can be prevented from being generated. Further, if a plurality of transformers are respectively connected to a plurality of frequency converters, each frequency converter can be easily and independently controlled so that the precision of generation of the X-rays can be enhanced, and even if one or some frequency converters become defective, the apparatus can be continuously operated by using the remaining frequency converters. The frequency can be further increased by connecting the capacitor to the secondary winding of the transformer to form an LC resonance circuit and effect the resonance operation.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An X-ray generator apparatus connected to an A.C. power source and for applying a D.C. voltage to an X-ray tube, comprising:
   a single frequency converting means connected to said A.C. power source, for receiving an A.C. voltage from said A.C. power source and increasing the frequency of an input A.C. voltage
   at least four transformer means connected in parallel to an output of said single frequency converting means, for respectively receiving an A.C. output voltage from said single frequency converting means and respectively increasing the input A.C. voltage; and
   rectifier means for rectifying outputs from said at least four transformer means and applying a D.C. voltage corresponding to the sum of the outputs from said at least four transformer means to said X-ray tube.

2. An apparatus according to claim 1, in which said rectifier means includes at least four rectifiers respectively connected to output terminals of said at least four transformer means.

3. An apparatus according to claim 1, further comprising resonance circuits respectively connected to secondary windings of said at least four transformer means.

4. An apparatus according to claim 1, in which at least secondary windings of said at least four transformer means and said rectifier means are molded with solid or gel insulating material.

5. An apparatus according to claim 2, in which combinations of at least secondary windings of said at least four transformer means and said at least four rectifiers are molded one or a preset number at a time with solid or gel insulating material.

6. An apparatus according to claim 1, in which each of said at least four transformer means includes a primary winding, secondary winding and cores on which the primary and secondary windings are wound, and said cores are formed of ferrite.

7. An apparatus according to claim 1, in which said frequency converting means includes means for controlling a pulse width or pulse frequency of switching pulses applied to a switching transistor included in the frequency converting means in order to control the output voltage of the frequency converting means.

8. An apparatus according to claim 1, in which said single frequency converting means comprises:
   a rectifier connected to the A.C. power source for converting the A.C. voltage to a D.C. voltage;
   a capacitor connected to the rectifier for filtering the D.C. voltage; and
   an inverter connected to the capacitor for converting the D.C. voltage filtered by the capacitor to an A.C. voltage of a desired frequency, and in which said at least four transformer means are connected to the inverter in parallel with each other.

9. An apparatus according to claim 8, in which one end of a primary winding of each of said at least four transformers is connected to one output terminal of the inverter and the other end of the primary winding of each of said at least four transformers is connected to the other output terminal of the inverter.

10. An apparatus according to claim 1, in which said single frequency converting means comprises:
    a rectifier connected to the A.C. power source for converting the A.C. voltage to a D.C. voltage;
    a battery connected to the rectifier; and
    an inverter connected to the battery for converting the D.C. voltage from the battery into an A.C. voltage of a desired frequency, and in which said plurality of transformers are connected to the inverter in parallel with each other.

11. An apparatus according to claim 1, wherein said single frequency converting means and said at least four transformer means are structured to increase the frequency of the input A.C. voltage up to a level above 15 KHz.

12. An X-ray generator apparatus connected to an A.C. power source and for applying a D.C. voltage to an X-ray tube, comprising:
    at least four frequency converting means connected in parallel to said A.C. power source, each said frequency converting means including a rectifier for rectifying an A.C. voltage from said A.C. power source to a D.C. voltage, said at least four frequency converting means converting each said D.C. voltage to an A.C. voltage output of a desired high frequency;
    at least four transformer means respectively connected to the A.C. voltage outputs of said at least four frequency converting means, for increasing output voltages of said frequency converting means; and
    rectifier means for rectifying outputs from said at least four transformer means and applying a D.C. voltage corresponding to the sum of the outputs from said at least four transformer means to said X-ray tube.

13. An apparatus according to claim 12, further comprising resonance circuits including a separate capacitor connected in parallel to a secondary winding of each said transformer means.

14. An apparatus according to claim 12, in which said rectifier means includes at least four rectifiers respectively connected to output terminals of said at least four transformer means.

15. An apparatus according to claim 14, in which combinations of at least secondary windings of said at least four transformer means and said at least four rectifiers are molded one or a preset number at a time with solid or gel insulating material.

16. An apparatus according to claim 12, in which at least secondary windings of said at least four transformer means and said rectifier means are molded with solid or gel insulating material.

17. An apparatus according to claim 12, in which each of said at least four frequency converting means comprised as:
    a battery connected to the rectifier; and
    an inverter connected to the battery for converting the D.C. voltage output from the battery into the A.C. voltage output, and in which each of said at least four transformers is connected to the inverter of a different one of said at least four frequency converting means.

18. An apparatus according to claim 12, in which each of said at least four transformer means includes a primary winding, secondary winding and cores on which the primary and secondary windings are wound, and said cores are formed of ferrite.

19. An apparatus according to claim 12, in which each of said at least four frequency converting means includes means for controlling a pulse width or pulse frequency of switching pulses applied to a switching transistor included in the frequency converting means in order to control the output voltage of the frequency converting means.

20. An apparatus according to claim 12, in which said at least four transformer means are respectively connected to said at least four frequency converting means.

21. An apparatus according to claim 12, in which each of said at least four frequency converting means comprises:

a capacitor connected to the rectifier for filtering the D.C. voltage; and an inverter connected to the capacitor for converting the D.C. voltage filtered by the capacitor to the A.C. voltage output, and in which each of said at least four transformers is connected to the inverter of a different one of said at least four frequency converting means.

22. An X-ray generator apparatus for applying a high D.C. voltage to an X-ray tube, comprising:

a voltage input terminal; and plural high voltage generator units connected to said voltage input terminal, each of which outputs being connected in series and applied to the X-ray tube, each of the high voltage generator units comprising:

means for converting an input voltage into an A.C. voltage of a predetermined frequency which is above 15 KHz;

plural transformer means connected to said converting means for increasing the A.C. voltage from said converting means; and means for rectifying outputs of said plural transformer means.

23. An apparatus according to claim 22, in which a resonance capacitor is connected to each of said plural transformer means.

24. An apparatus according to claim 22, in which said plural transformer means include plural secondary windings connected in series to one another and said rectifying means comprises a rectifier included in a series connection of said plural secondary windings.

25. An apparatus according to claim 22, in which said plural transformer means comprise primary windings connected in parallel to said voltage input terminal and secondary windings.

26. An apparatus according to claim 25, in which said secondary windings and rectifying means are molded with solid or gel insulating material.

27. An apparatus according to claim 22, in which said voltage input terminal is connected to an A.C. power supply, each of said high voltage generator units is connected to said voltage input terminal via a rectifier circuit, and said converting means comprises a frequency converter.

28. An apparatus according to claim 22, in which said rectifying means comprises plural rectifiers respectively connected to said plural transformer means and connected in series to one another.

* * * * *